US008606780B2

(12) United States Patent
Hu et al.

(10) Patent No.: US 8,606,780 B2
(45) Date of Patent: Dec. 10, 2013

(54) IMAGE RE-RANK BASED ON IMAGE ANNOTATIONS

(75) Inventors: Rui Hu, Beijing (CN); Xin-Jing Wang, Beijing (CN); Juan Xu, Beijing (CN); Xiao Kong, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 189 days.

(21) Appl. No.: 13/179,258

(22) Filed: Jul. 8, 2011

(65) Prior Publication Data

US 2013/0013591 A1  Jan. 10, 2013

(51) Int. Cl.
  G06F 7/00  (2006.01)
  G06F 17/30  (2006.01)
(52) U.S. Cl.
  USPC ............................ 707/730; 707/749; 707/915
(58) Field of Classification Search
  USPC .................. 707/730, 731, 750, 776, 915, 749
  See application file for complete search history.

(56) References Cited

U.S. PATENT DOCUMENTS

| | | | |
|---|---|---|---|
| 7,836,050 B2 | 11/2010 | Jing et al. | |
| 8,341,150 B1* | 12/2012 | Riley et al. | 707/728 |
| 2007/0271226 A1* | 11/2007 | Zhang et al. | 707/3 |
| 2009/0063455 A1 | 3/2009 | Li et al. | |
| 2009/0154795 A1 | 6/2009 | Tan et al. | |
| 2009/0313239 A1* | 12/2009 | Wen et al. | 707/5 |
| 2010/0063961 A1* | 3/2010 | Guiheneuf et al. | 707/622 |
| 2010/0082583 A1* | 4/2010 | Chang et al. | 707/706 |
| 2011/0106782 A1* | 5/2011 | Ke et al. | 707/706 |

OTHER PUBLICATIONS

Wu et al. Practical Elimination of Near-Duplicates from Web Video Search. 2007. In Proceedings of the 15th international conference on Multimedia (Multimedia '07). ACM, New York, NY, USA, pp. 218-227.*
Zhao et al. On the Annotation of Web Videos by Efficient Near-Duplicate Search. Aug. 2010. IEEE Transactions on Multimedia. vol. 12, No. 5. pp. 448-461.*
Wang, et al., "Image Annotation Refinement using Random Walk with Restarts", In Proceedings of the 14th annual ACM international conference on Multimedia, Oct. 23-27, 2006, 4 pages.
Zhao, et al., "Co-Training for Search-Based Automatic Image Annotation", In Proceedings of Journal of Digital Information Management, Apr. 2008, 6 pages, vol. 6.
Wang, et al., "Content-Based Image Annotation Refinement", In Proceedings of Computer Vision and Pattern Recognition, Jun. 17-22, 2007, 8 pages.
Valle, et al., "Advanced Techniques in CBIR Local Descriptors, Visual Dictionaries and Bags of Features", In proceedings of Computer Graphics and Image Processing (SIBGRAPI Tutorials), Oct. 11-14, 2009, 7 pages.
Jain, et al., "Learning to Re-Rank: Query-Dependent Image Re-Ranking Using Click Data", Published on: Mar. 28-Apr. 1, 2011, Available at: http://research.microsoft.com/en-us/um/people/manik/pubs%5Cjain11.pdf.

* cited by examiner

Primary Examiner — James E Richardson
(74) Attorney, Agent, or Firm — Shook, Hardy & Bacon L.L.P.

(57) ABSTRACT

Search queries for images are received from users. An original order of responsive images to the query is determined. Duplicate images and words associated with the duplicate images are identified for each of the responsive images. Common words associated with the duplicate images are identified. The responsive images are annotated with the common words and an annotated order is determined. A re-ranked order is determined based on the original order and the annotated order. Responsive images are presented to the user in the re-ranked order.

15 Claims, 6 Drawing Sheets

IMAGE RE-RANK BASED ON IMAGE ANNOTATIONS

BACKGROUND

Various methods for search and retrieval of images, such as by a search engine over a wide area network, are known in the art. Such methods typically employ text-based searching. Text-based searching employs a search query that comprises one or more textual elements such as words or phrases. The textual elements are compared to an index or other data structure to identify documents such as web pages that include matching or semantically similar textual content, metadata, file names, or other textual representations.

The known methods of text-based searching work relatively well for text-based documents, however they are difficult to apply to image files. In order to search image files via a text-based query the image file is associated with one or more textual elements, such as a title, file name, or other metadata or tags. The search engines and algorithms employed for text-based searching cannot search image files based on the content of the image and thus, are limited to identifying search result images based only on the data associated with the images.

Image metadata is typically derived from parent page text or cross page anchor text. Unfortunately, parent page text and cross page anchor text is not always available. Even when it is available, it is not always relevant to the image. In instances where it is relevant, it is often difficult to accurately extract the relevant portion of the text. This difficult leads to inaccurate search results that create a frustrating experience for users searching for images. A more accurate method for annotating and ranking images is needed so the relevance of images associated with image searches can be improved.

SUMMARY

Embodiments of the present invention relate to systems, methods, and computer-readable media for, among other things, re-ranking images based on annotations. In this regard, embodiments of the present invention receive search queries for images from users. An original order of responsive images to the query is identified. Duplicate images and words associated with the duplicate images are identified for each of the responsive images. A mathematical model is trained to identify the most common words associated with the duplicate images. The responsive images are annotated with the common words and an annotated order is identified. A re-ranked order is determined based on the original order and the annotated order. Responsive images are presented to the user in the re-ranked order.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In the discussion below, the following definitions are used to describe aspects of re-ranking images based on annotations. A feature refers to any type of information that can be used as part of selection and/or ranking of a document as being responsive to a search query. Features from a text-based query typically include keywords. Visual features can include portions of an image identified as being distinctive, such as portions of an image that have contrasting intensity or portions of an image that correspond to a particular shape. Visual features also include colors, shapes, sizes, and position. A keyword refers to a conventional text-based search term. A keyword can refer to one or more words that are used as a single term for identifying a document responsive to a query. A descriptor keyword refers to a keyword that has been associated with a non-text based feature. Thus, a descriptor keyword can be used to identify an image-based feature, a video-based feature, an audio-based feature, or other non-text features. A responsive image refers to any document that is identified as relevant to a search query based on selection and/or ranking performed by a search engine. When a responsive image is displayed, the responsive image can be displayed by displaying the document itself, or an identifier of the document can be displayed. For example, the conventional hyperlinks, also known as the "blue links" returned by a text-based search engine represent identifiers for, or links to, other documents. By clicking on a link, the represented document can be accessed. Identifiers for a document may or may not provide further information about the corresponding document.

Embodiments of the present invention relate to systems, methods, and computer storage media having computer-executable instructions embodied thereon that re-rank responsive images based on annotations derived from common words associated with duplicates and near-duplicate images. In this regard, embodiments of the present invention perform more effective, annotation based image searches. Searches are performed by receiving search queries for images from users. An original order of responsive images to the search query is determined. Duplicate images and words associated with the duplicate images are identified. The most common words associated with the duplicate images are identified.

The responsive images are annotated with the most common words and an annotated order of responsive images is determined based on these annotations. A re-ranked order of the responsive images is determined based on the original order and the annotated order. Accordingly, a user searching for a particular image receives responsive images in an order that reflects greater accuracy based on the annotations with the most common words. Responsive images are presented to the user in the re-ranked order.

Accordingly, in one aspect, the present invention is directed to computer storage media having computer-executable instructions embodied thereon, that when executed, cause a computing device to perform a method for re-ranking images based on image annotations. The method includes receiving a search query for an image from a user. The method further includes determining an original order of responsive images responsive to the search query. Duplicate images and words associated with the duplicate images are identified for each of the responsive images. Common words of the words associated with the duplicate images are identified. The responsive images are annotated with the common words. An annotated order of the responsive images with annotations is determined. A re-ranked order of the responsive images based on the original order and the annotated order is determined.

In another aspect, the present invention is directed to a computer system for re-ranking images based on image annotations, the computer system comprising a processor couple to a computer-storage medium, the computer-storage medium having stored thereon a plurality of computer software components. The computer software components comprise a search query component for receiving a search query for an image from a user. The computer software components further comprises a ranking component for determining an original order for responsive images to the search query. An annotation component annotates the responsive images with annotations. A re-ranking component determines a re-ranked order for responsive images responsive to the search query. A results component presents the responsive images in the re-ranked order to the user.

In yet another aspect, the present invention is directed to a computerized method for re-ranking images based on image annotations. The method includes receiving a search query for an image from a user. An original order of responsive images to the search query is identified. Duplicate images and words associated with the duplicate images are identified for each of the responsive images. A common word mathematical model is trained to identify common words of the words associated with the duplicate images. The responsive images are annotated with the common words. An annotated order of the responsive images with annotations is identified. A re-ranked order of the responsive images based on the original order and the annotated order is determined. The responsive images are presented to the user in the re-ranked order.

Having briefly described an overview of the present invention, an exemplary operating environment in which various aspects of the present invention may be implemented is described below in order to provide a general context for various aspects of the present invention. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
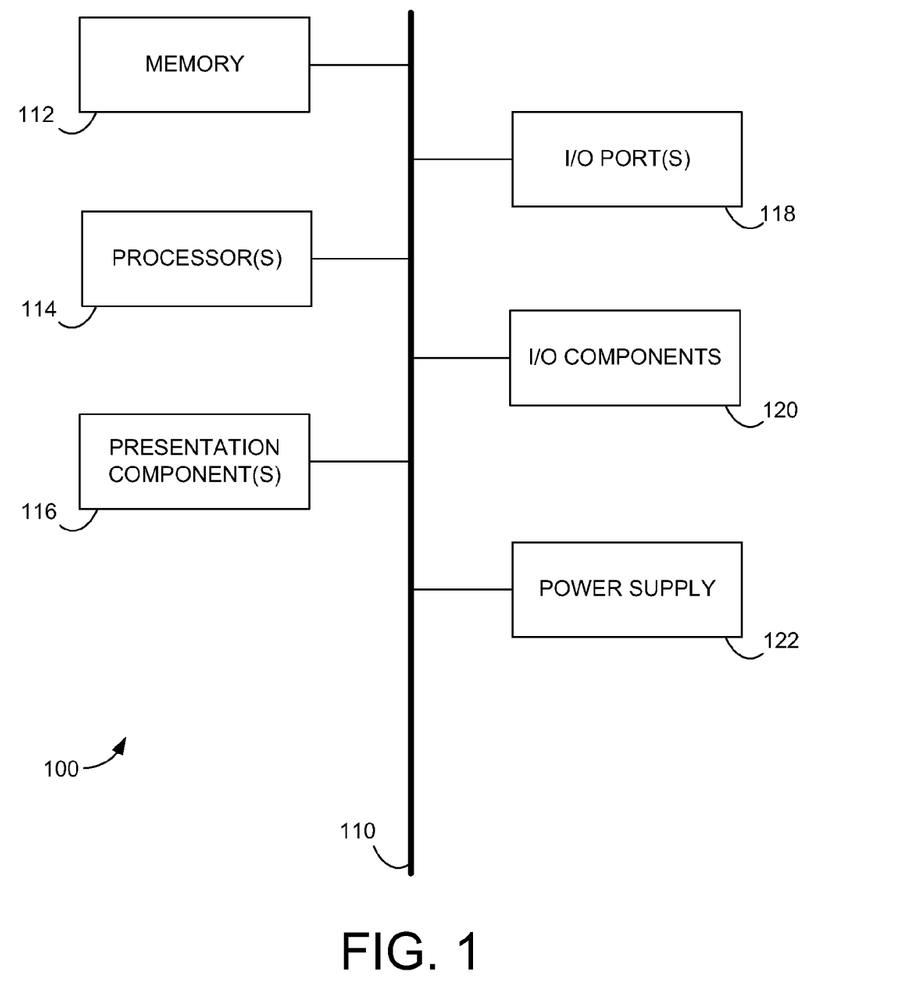
FIG. 1 is a block diagram of an exemplary computing environment suitable for use in implementing embodiments of the present invention.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
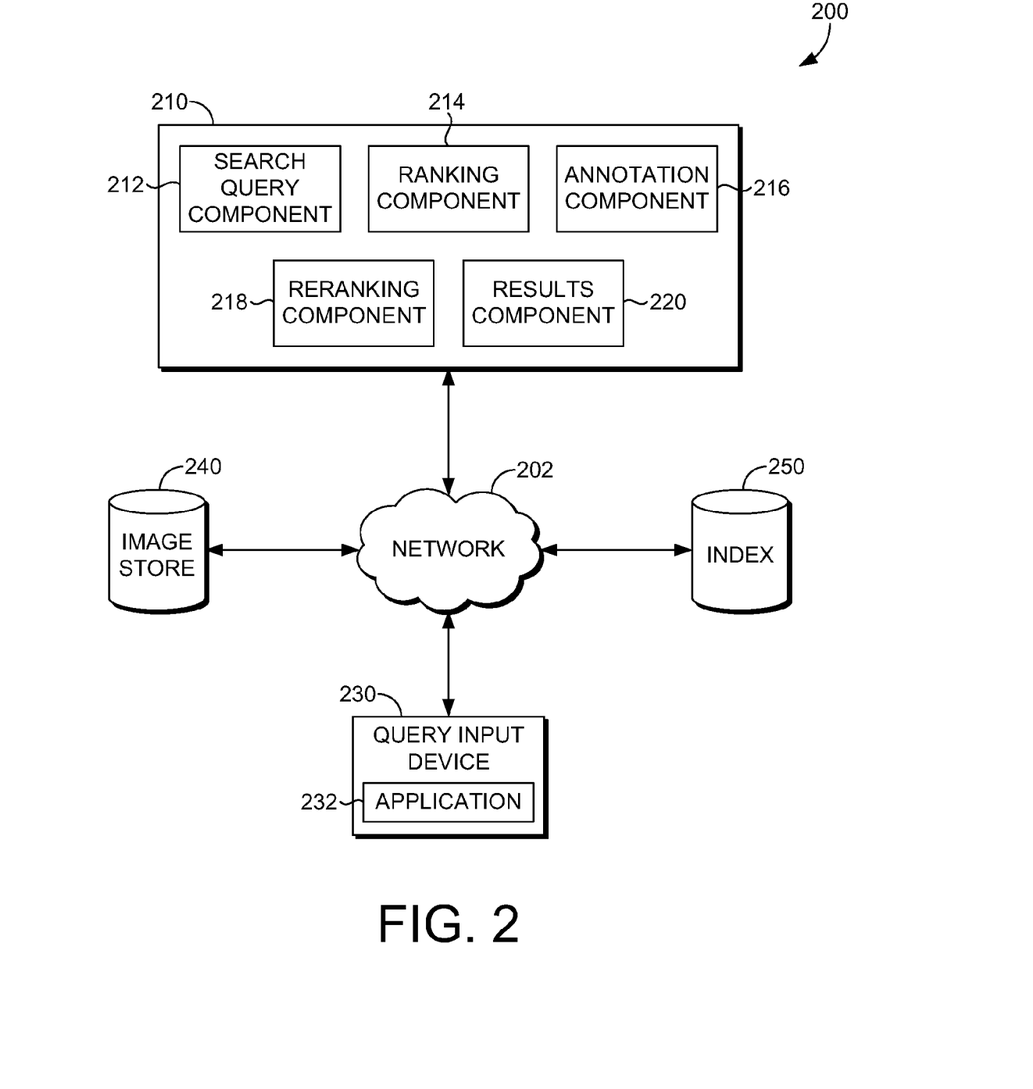
FIG. 2 schematically shows a network environment suitable for performing embodiments of the invention.

With reference to FIG. 2, a network environment is illustrated that shows an exemplary computing environment 200 configured for use in implementing embodiments of the present invention. It will be understood and appreciated by those of ordinary skill in the art that the environment 200 shown in FIG. 2 is merely an example of one suitable environment and is not intended to suggest any limitation as to the scope of use or functionality of the present invention. Neither should the environment 200 be interpreted as having any dependency or requirement related to any single module/component or combination of modules/components illustrated therein.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The environment 200 includes a network 202, a search engine server 210, a query input device 230, an image store 240, and an index 250. The network 202 includes any computer network such as, for example and not limitation, the Internet, an intranet, private and public local networks, and wireless data or telephone networks. The query input device 230 is any computing device, such as the computing device 100, and includes an application 232 from which a search query can be initiated. For example, the query input device 230 might be a personal computer, a laptop, a server computer, a wireless phone or device, a personal digital assistant (PDA), or a digital camera, among others. In an embodiment, a plurality of query input devices 230, such as thousands or millions of query input devices 230, is connected to the network 202.

The search engine server 210 includes any computing device, such as the computing device 100, and provides at least a portion of the functionalities for providing a content-based search engine.

Components of the query input device 230 and the search engine server 210 may include, without limitation, a processing unit, internal system memory, and a suitable system bus for coupling various system components, including one or more databases for storing information (e.g., files and metadata associated therewith). Each of the query input device 230 and the search engine server 210 typically includes, or has access to, a variety of computer-readable media.

The search engine server 210 is communicatively coupled to an image store 240 and an index 250. The image store 240 includes any available computer storage device, or a plurality thereof, such as a hard disk drive, flash memory, optical memory devices, and the like. The image store 240 provides data storage for image files that may be provided in response to a search query in an embodiment of the invention. The index 250 includes any available computer storage device, or a plurality thereof, such as a hard disk drive, flash memory, optical memory devices, and the like. The index 250 provides a search index for identifying images available via network 202, including the images stored in the image store 240. The index 250 may utilize any indexing data structure or format, such as an inverted index format. When searching for images associated with a particular query, the index is traversed to identify images associated with that query. In an embodiment, the search engine server 210, image store 240, and index 250 are directly communicatively coupled so as to allow direct communication between the devices without traversing the network 202.

It will be understood by those of ordinary skill in the art that computing system architecture 200 is merely exemplary. While the search engine server 210 is illustrated as a single unit, one skilled in the art will appreciate that the search engine server 210 is scalable. For example, the search engine server 210 may in actuality include a plurality of computing devices in communication with one another and may share or distribute the functionalities for providing search engine operations to a user population. Moreover, the index 250, or portions thereof, may be included within the search engine server 210. The single unit depictions are meant for clarity, not to limit the scope of embodiments in any form.

As shown in FIG. 2, the search engine server 210 includes, among other components, a search query component 212, a ranking component 214, an annotation component 216, a reranking component 218, and a results component 220, a weight factor training component (not shown in FIG. 2), a near-duplicates component (not shown in FIG. 2), an extraction component (not shown in FIG. 2), and a common word component (not shown in FIG. 2).

The search query component 212 receives a search query for an image from a user via the application 230 on the query input device 230. After the search query is received by the search query component 212, the index 250 is searched to identify responsive images in the image store 240. The ranking component 214 determines an original order for the responsive images based on a search engine ranking algorithm.

Responsive images can be any type of image determined to be relevant by a search engine. The responsive images displayed to a user can be in the form of the images themselves, or in the form of identifiers for responsive documents. One or more indexes can be used to facilitate identification of responsive images. In an embodiment, a single index, such as an inverted index, can be used to store keywords and descriptor keywords based on all types of search modes. Alternatively, a single ranking system can use multiple indexes to store terms or features. Regardless of the number or form of the indexes, the one or more indexes can be used as part of an integrated selection and/or ranking method for identifying images that are responsive to a query. The selection method and/or ranking method can incorporate features based on any available mode of query input.

An annotation component 216 annotates the responsive images with annotations from duplicate and near-duplicate images. A re-ranking component 218 determines a re-ranked order for the responsive images based on the original order and an annotated order. The annotated order is an order for the responsive images after the responsive images have been annotated by the annotation component 216. A results component 220 presents the responsive images in the re-ranked order to the user.

In one embodiment, a weight factor is applied to the original order and the annotated order to determine the re-ranked order. In one embodiment, the weight factor is configurable. In one embodiment, the weight factor training component (not shown in FIG. 2) trains a mathematical model to determine the weight factor. This allows the training component to learn the appropriate influence that should be afforded to each of the original order and the annotated order. In practice, the weight factor influences the importance of the original order and the annotated order in the determination of the re-ranked order, which in turn, influences the order of responsive images as they are presented to the user.

A near-duplicates component (not shown in FIG. 2) identifies near-duplicate images. In one embodiment, near-duplicate images include duplicate images. There currently exist many algorithms to determine whether a query image and a digital image are near-duplicates. For better performance, near-duplicates may be referenced in a previously prepared index in the image store. During a pre-processing phase, all images in the image store may be scanned. Where a first image is determined to be a near-duplicate of an image, a link indicating that the first and second images are near-duplicates of each other is stored. One approach to determining whether an image and a second image are near-duplicates is to extract similarity attributes from a first image and similarity attributes of a second image. If the similarity attributes from the first and second images are within a predetermined threshold, then the first and second images are deemed to be near-duplicates.

With a previously prepared index, performance may improve responsiveness such that applications utilizing the metadata comparison process may be performed on-line and interactively. Specifically, a query may be received, near-duplicate metadata compared, and search results returned all in the same session.

The link may be in the form of a cross reference indicating that the first and second images are related. Alternatively, the link may be in the form of a conceptual class where the first and second images are associated with that conceptual class. Specifically, a first image is known to belong to a conceptual class. When a second image is determined to be a near-duplicate of the first image, the conceptual classes that the first image belongs to are determined and then associated with the second image.

Another way to determine whether a first image and a second image are near-duplicates is to compare visual words associated with each image. A visual word is the result from a vector quantization on a visual feature extracted from an image, such as sift or a color histogram. An inverted index is built in which each visual word is a key that is mapped to the image from which the visual word was extracted. Accordingly, images with visual words in common, or with similar visual words may be retrieved, the similarity of their attributes as represented by the visual words compared, and where the similarities are within a predetermined threshold, those images may be considered near-duplicates.

For example, a search query of any mode may result in a known image of the Eiffel Tower as a responsive image. The metadata from the responsive image may indicate that the Eiffel Tower is the subject of the responsive image. The metadata from another responsive image may indicate that Paris, France is the subject of the responsive image. Metadata from other responsive images may indicate the time of day, a date, a season, something that appears in the background, identification of people appearing in the image, and the like as the subjects of the responsive image. As is apparent, some metadata may appear commonly in multiple responsive images that are duplicate or near-duplicate images. These common words can be used to annotate each of the duplicate or near-duplicate images to achieve a more accurate list of responsive images that will ultimately be ranked and presented to the user. Common words can be identified through multiple methods. For example, in one embodiment, common words can be identified by counting co-occurrences in the query log. In another embodiment, common words can be identified through Bayesian analysis. In yet another embodiment, a linear regression model can be trained to identify the common words.

In one embodiment, an extraction component (not shown in FIG. 2) extracts text associated with the duplicate or near-duplicate images. An image, video, or audio file often has metadata associated with the file. This can include the title of the file, a subject of the file, or other text associated with the file. The other text can include text that is part of a document where the media file appears as a link, such as a web page, or other text describing the media file. The metadata associated with an image, video, or audio file can be used to supplement a query input in a variety of ways. The text metadata can be used to form additional query suggestions that are provided to a user. The text can also be used automatically to supplement an existing search query, in order to modify the ranking of responsive images.

There are multiple ways to extract metadata. The metadata extraction technique may be predetermined or it may be selected dynamically either by a person or an automated process. Metadata extraction techniques can include, but are not limited to: (1) parsing the filename for embedded metadata; (2) extracting metadata from the near-duplicate digital object; (3) extracting the surrounding text in a web page where the near-duplicate digital object is hosted; (4) extracting annotations and commentary associated with the near-duplicate from a web site supporting annotations and commentary where the near-duplicate digital image is stored; and (5) extracting query keywords that were associated with the near-duplicate when a user selected the near-duplicate after a text query. In other embodiments, metadata extraction techniques may involve other operations.

Some of the metadata extraction techniques start with a body of text and sift out the most concise metadata. Accordingly, techniques such as parsing against a grammar and other token-based analysis may be utilized. For example, surrounding text for an image may include a caption or a lengthy paragraph. At least in the latter case, the lengthy paragraph may be parsed to extract terms of interest. By way of another example, annotations and commentary data are notorious for containing text abbreviations (e.g. IMHO for "in my humble opinion") and emotive particles (e.g. smileys and repeated exclamation points). IMHO, despite its seeming emphasis in annotations and commentary, is likely to be a candidate for filtering out where searching for metadata.

In the event multiple metadata extraction techniques are chosen, a reconciliation method can provide a way to reconcile potentially conflicting candidate metadata results. Reconciliation may be performed, for example, using statistical analysis and machine learning or alternatively via rules engines.

In one embodiment, a common words component (not shown in FIG. 2) identifies common words extracted by the extraction component. For example, in addition to using metadata associated with an input query, the metadata associated with responsive images can be used to identify the most common words associated with duplicate or near-duplicate images. A duplicate image is an image that is an exact match of another image. A first image is a near-duplicate of a second image if the first image stores similar data as the second image, but has slight differences in attributes not of interest to searching users. Attributes of interest are referred to herein as "similarity attributes" and are used to determine whether an image is a near-duplicate or not. If a first and second image are identified as duplicates or near-duplicates, then the metadata associated with each image can be compared to identify the most common words of the metadata. The first and second image can then be annotated with the most common words to improve the accuracy of their search ranking.

In one embodiment, the common word component trains a common word mathematical model to identify the common words associated with the duplicates or near-duplicates. In one embodiment, the annotation component 216 receives the common words from the common word component and annotates the responsive images with annotations comprised of the common words.

Figure 3:
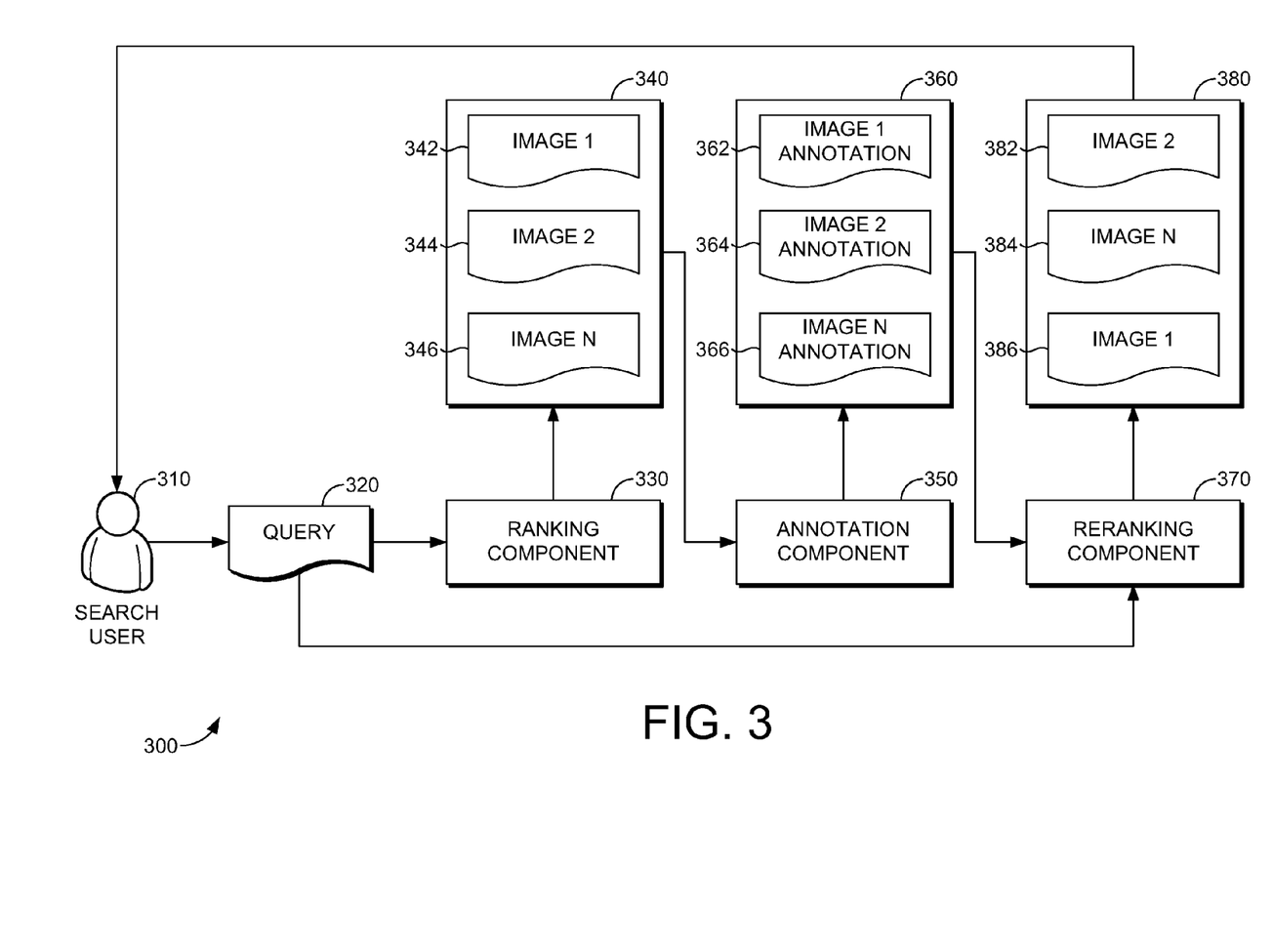
FIG. 3 schematically shows a flow diagram suitable for performing embodiments of the invention.

Referring now to FIG. 3, a flow diagram suitable for performing embodiments of the invention is shown. A user 310 submits a query 320. The ranking component 330 returns an original order 340 of responsive images. The original order 340 comprises Image 1 342, Image 2 344, and Image N 346. The annotation component 350 compares the annotations 360 associated with each of the images. Image Annotation 1 362, Image Annotation 2 364, and Image Annotation N 366 are compared utilizing any of the methods disclosed herein to identify the common words associated with each image. In various embodiments, the common words are identified by counting co-occurrences of words associated with the duplicate or near-duplicate images, utilizing Bayesian analysis, training a mathematical model, or some other techniques. After the annotation component 350 annotates each of the responsive images with the common words, the reranking component 370 returns a re-ranked order 380 of the responsive images. The re-ranked order 380 comprises Image 2 382, Image N 384, and Image 1 386. As can be appreciated the query 320 may return any number of responsive images, and after the responsive images are annotated with the most common words associated with the duplicates and near-duplicates for each image, the reranking component may return a re-ranked order that is varies from slightly different to significantly different, depending on the query 320. Further, it should be appreciated that each of the images of the responsive images may be associated with different duplicate and near-duplicate images, thus resulting in different annotations.

Figure 4:
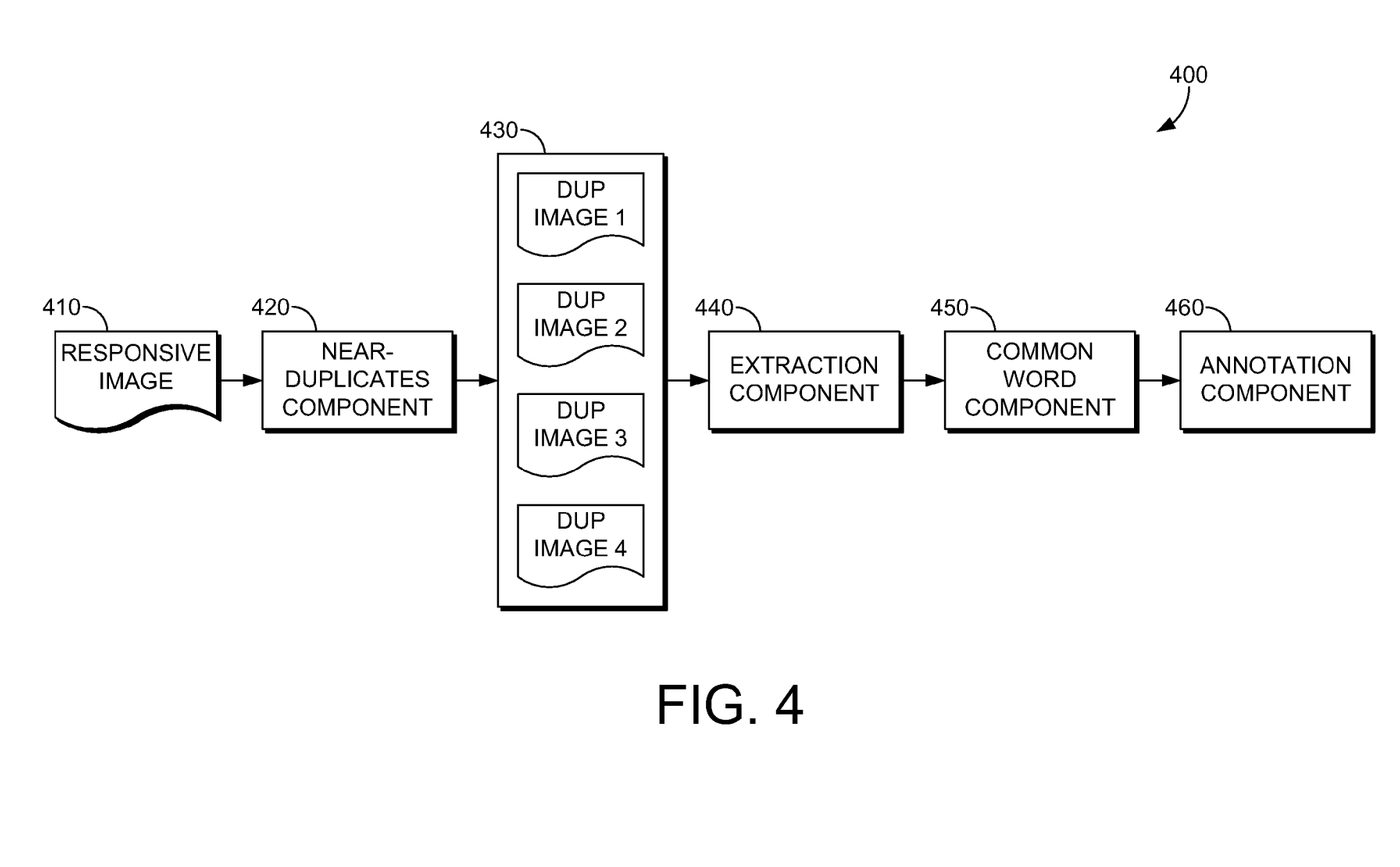
FIG. 4 schematically shows a flow diagram suitable for performing embodiments of the invention.

Referring now to FIG. 4, a flow diagram suitable for performing embodiments of the invention is shown. After a responsive image 410 is identified, a near-duplicates component 420 identifies duplicate and near-duplicate images 430. An extraction component 440 extracts text or metadata associated with each of the near-duplicate images 430. A common word component 450 identifies the common words extracted by the extraction component 440. An annotation component 460 receives the common words from the common word component 450 and annotates the responsive images with the common words.

Figure 5:
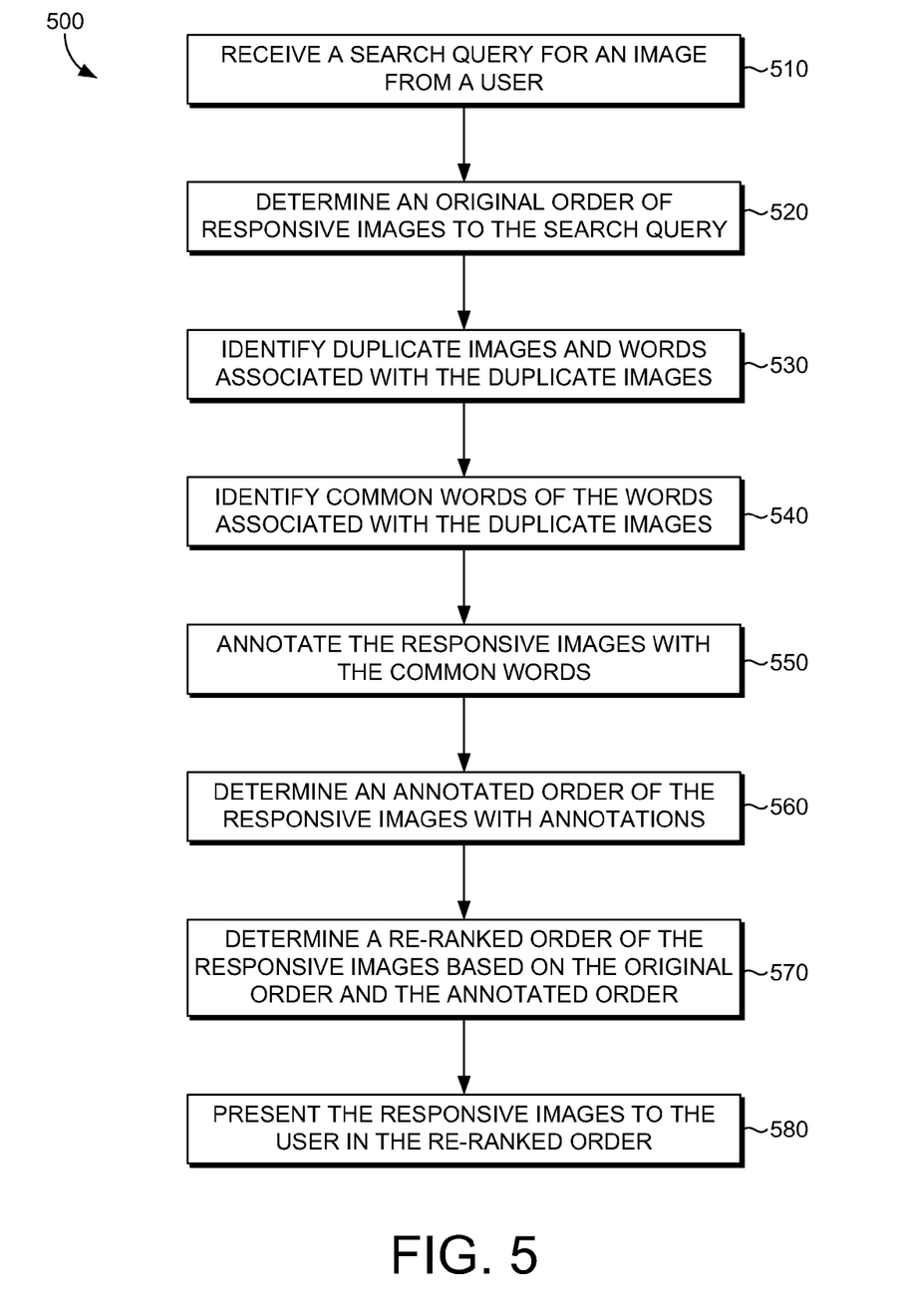
FIG. 5 is a flow diagram showing a method for re-ranking images based on annotations, in accordance with an embodiment of the present invention.

Referring now to FIG. 5, a flow diagram illustrates a method for re-ranking images based on annotations, in accordance with an embodiment of the present invention. At step 510, a search query for an image is received from a user. An original order of responsive images to the search query is determined at step 520. Duplicate images and words associated with the duplicate images are identified at step 530. In one embodiment, duplicate images include near-duplicate images. Common words of the words associated with the duplicate images are identified at step 540. In one embodiment, a common word mathematical model is trained to identify the common words. In one embodiment, co-occurrences of words associated with the duplicate or near-duplicate images are counted to identify the common words. In one embodiment, Bayesian analysis is utilized to identify the common words. At step 550, the responsive images are annotated with the common words.

An annotated order of the responsive images with annotations is determined at step 560. In one embodiment, a matching score between the search query and the annotations is estimated. The annotated order of the responsive images is determined based on the matching score.

A re-ranked order of the responsive images is determined, at step 570, based on the original order and the annotated order. In one embodiment, a ranking mathematical model is trained to determine a weight factor to attribute to each of the original order and the annotated order. The re-ranked order of the responsive images is determined by applying the respective weight factors to the annotated order and the original order. The responsive images are presented to the user, at step 580, in the re-ranked order.

Figure 6:
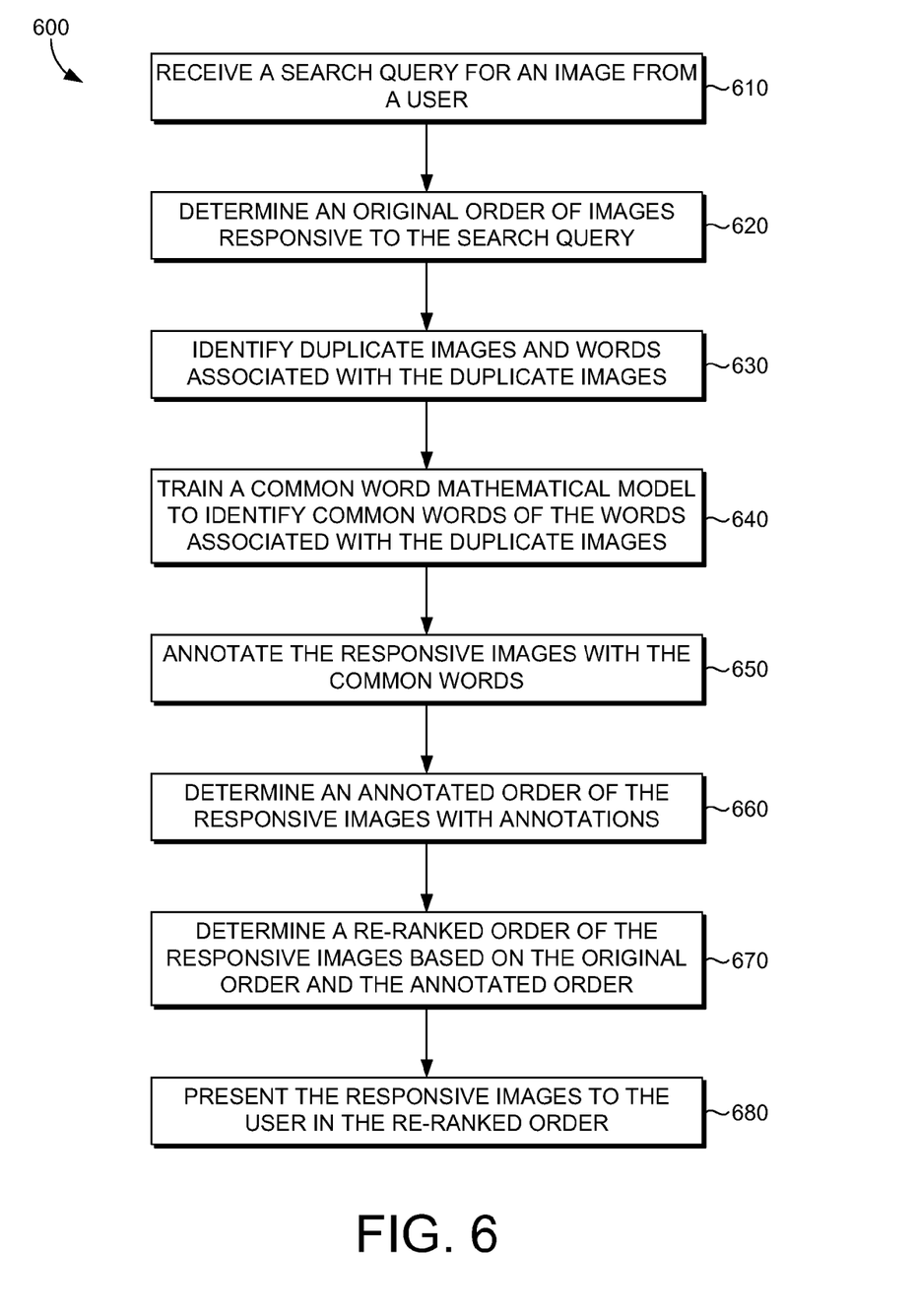
FIG. 6 is a flow diagram showing a method for re-ranking images based on annotations, in accordance with an embodiment of the present invention.

Referring now to FIG. 6, a flow diagram illustrates a method for re-ranking images based on annotations, in accordance with an embodiment of the present invention. A search query is received for an image, at step 610, from a user. An original order of responsive images to the search query is determined at step 620. At step 630, duplicate images and words associated with the duplicate images are identified.

A common word mathematical model is trained, at step 640, to identify common words of the words associated with the duplicate images. The responsive images are annotated, at step 650, with the common words. At step 660, an annotated order of the responsive images with annotations is determined. A re-ranked order of the responsive images is determined, at step 670, based on the original order and the annotated order. In one embodiment, a ranking mathematical model is trained to determine a weight factor for each of the original order and the annotated order. In one embodiment, the respective weight factors are applied to the original order and the annotated order and utilized by the search engine ranking algorithm to determine the re-ranked order. At step 680, the responsive images are presented to the user in the re-ranked order.

It will be understood by those of ordinary skill in the art that the order of steps shown in the method 500 and 600 of FIGS. 5 and 6 respectively are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. Computer-storage media storing computer-useable instructions, that, when executed by a computing device, perform a method for re-ranking images based on image annotations, the method comprising:
   receiving a search query for an image from a user;
   determining an original order of responsive images to the search query;
   identifying duplicate images and words associated with the duplicate images;
   identifying common words of the words associated with the duplicate images;
   annotating the responsive images with the common words;
   determining an annotated order of the responsive images with annotations, the annotated order being determined based on a matching score that is estimated between the search query and the annotations;
   determining a re-ranked order of the responsive images based on the original order and the annotated order; and
   presenting the responsive images to the user in the re-ranked order.

2. The media of claim 1 wherein determining a re-ranked order of the responsive images comprises:
   training a ranking mathematical model to determine a weight factor for the original order and the annotated order;
   applying the respective weight factor to the original order and the annotated order to determine the re-ranked order.

3. The media of claim 1, wherein duplicate images includes near-duplicate images.

4. The media of claim 1 further comprising training a common word mathematical model to identify the common words.

5. The media of claim 1 further comprising counting co-occurrences of words associated with the duplicate images to identify the common words.

6. The media of claim 1 further comprising utilizing Bayesian analysis to identify the common words.

7. A computer system for re-ranking images based on image annotations, the computer system comprising a processor coupled to a computer-storage medium, the computer-storage medium having stored thereon a plurality of computer software components executable by the processor, the computer software components comprising:
   a search query component for receiving a search query for an image from a user;
   a ranking component for determining an original order for responsive images to the search query;
   an annotation component for annotating the responsive images with annotations;
   a re-ranking component for determining a re-ranked order for responsive images to the search query based on the original order and an annotated order, the annotated order being determined based on a matching score that is estimated between the search query and the annotations;
   a results component for presenting the responsive images in the re-ranked order to the user;
   a near-duplicates component for identifying near-duplicate images;
   an extraction component for extracting text associated with the near-duplicate images; and
   a common word component for identifying common words extracted by the extraction component, wherein the annotation component receives the common words from the common word component and annotates the responsive images with annotations comprised of the common words.

8. The computer system of claim 7, wherein a weight factor is applied to the original order and an annotated order to determine the re-ranked order.

9. The computer system of claim 8, wherein the weight factor is configurable.

10. The computer system of claim 8, further comprising a weight factor training component for training a ranking mathematical model to determine the weight factor.

11. The computer system of claim 7, wherein duplicate images includes near-duplicate images.

12. The computer system of claim 7, wherein the common word component trains a common word mathematical model to identify the common words.

13. A computerized method for re-ranking images based on image annotations, the method comprising:
   receiving a search query for an image from a user;
   determining an original order of responsive images to the search query;
   identifying duplicate images and words associated with the duplicate images;
   training a common word mathematical model to identify common words of the words associated with the duplicate images;
   identifying the common words of the words associated with the duplicate images;
   annotating the responsive images with the common words;
   determining an annotated order of the responsive images with annotations, the annotated order being determined based on a matching score that is estimated between the search query and the annotations;
   determining a re-ranked order of the responsive images based on the original order and the annotated order; and
   presenting the responsive images to the user in the re-ranked order.

14. The computerized method of claim 13, further comprising training a ranking mathematical model to determine a weight factor for each of the original order and the annotated order.

15. The computerized method of claim 14, further comprising applying the respective weight factors to the original order and the annotated order.

* * * * *